UNITED STATES PATENT OFFICE.

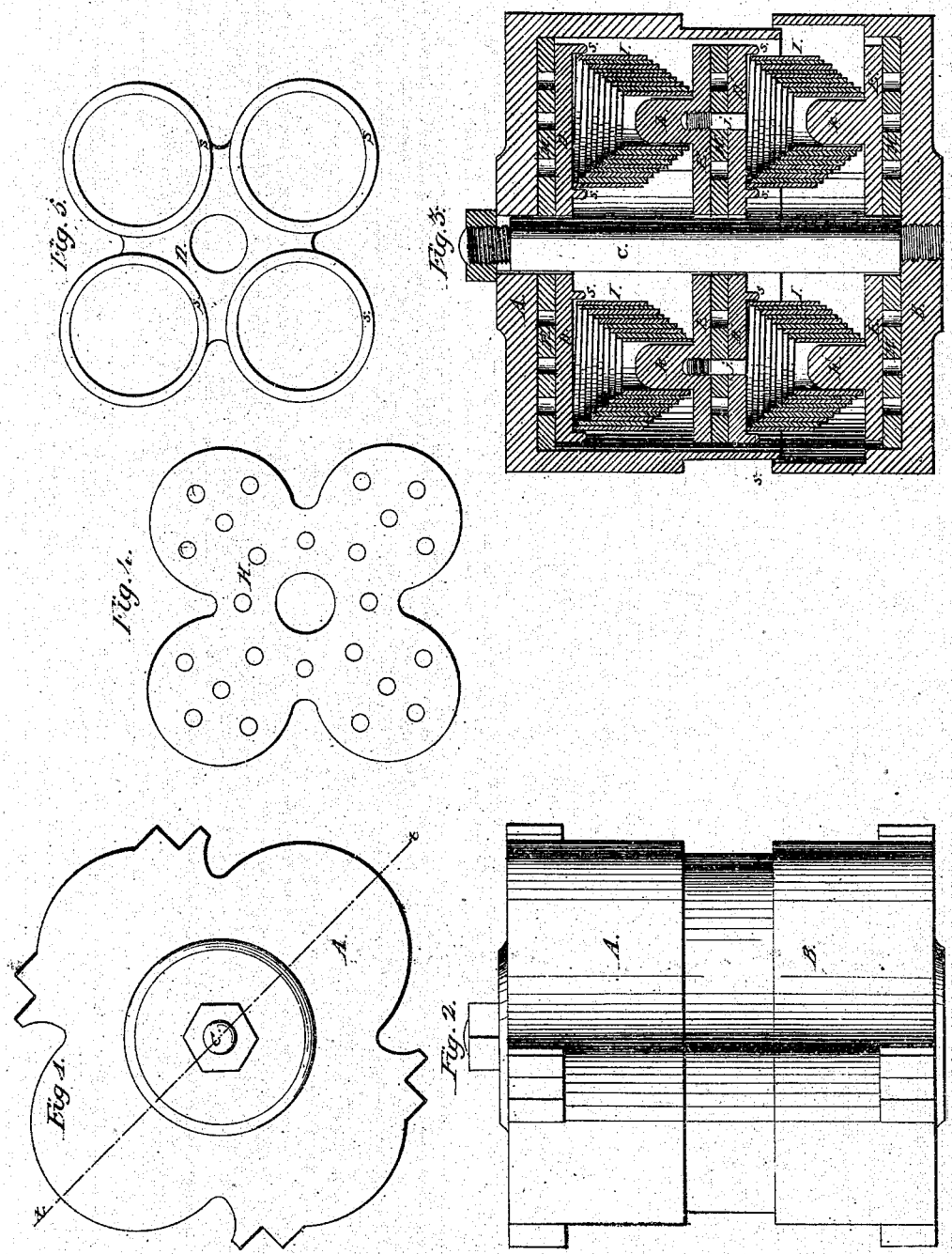

RICHARD VOSE, OF NEW YORK, N. Y.

IMPROVEMENT IN CAR-SPRINGS.

Specification forming part of Letters Patent No. 36,813, dated October 28, 1862.

*To all whom it may concern:*

Be it known that I, RICHARD VOSE, of the city, county, and State of New York, have invented a new and Improved Car-Spring; and I do hereby declare that the following is a full and exact description thereof, reference being had to the accompanying drawings, which form a part of this specification.

Figure 1 is a top view of said spring; Fig. 2, a side view; Fig. 3, a section in the line $t\ t$ of Fig. 1; and Figs. 4 and 5 are views of detached portions of said spring.

My improved car-spring is composed of one or more series or clusters of light volute springs, I I, and a series of layers, H H, of india-rubber, gutta-percha, felting, leather, or some other elastically-yielding substance, arranged with a series of guiding and steadying metallic plates, D D' and E E', within a suitable protecting-casing, in the manner represented in the accompanying drawings.

I construct my improved car-spring of the above-mentioned parts in the following manner, viz: One of the layers H is first placed in the bottom of the lower portion, B, of the casing. Then a metallic plate, E', of corresponding shape to the said elastic layer, and which has four teat-shaped projections, $k'\ k'$, rising from its upper surface, is placed upon the said elastic layer H. Then four volute springs, I I I I, are placed upon the said plate E', and in such positions as to cause the said springs to each embrace one of the projections $k'$ of said plate, as shown in Fig. 3. Then I place the metallic plate D' upon the before-mentioned springs I I, the said plate having four annular flanges descending from its under surface, which embrace the upper ends of the said springs I I. Then I place upon the metallic plate D' a layer H, and then upon the said layer I place the metallic plate E, the said layer H being held in its position between the said plates by means of the pins $j\ j$, which descend from the plate E and pass through apertures in the layer H, and also through corresponding apertures in the plate D', as shown in Fig. 3. Then upon the metallic plate E, I place another set of four volute springs I I, the said springs being kept in position by the four projections $k\ k$, which rise from the said plate, and which are respectively embraced by the said springs.

This last-mentioned set of springs is covered and embraced by the metallic plate D, which exactly corresponds in shape with the before-mentioned plate D', and between the said metallic plate D and the inner surface of the head of the portion A of the casing I place another elastic layer H. The respective parts A and B of the casing of my improved car-spring are of such a shape that one of said parts is allowed to slide freely upon the other, and the separation of said parts is prevented by the central screw-bolt, C.

In the construction of my said improved car-spring I do not intend to limit myself to the use of any precise number of volute springs I I in each cluster; nor do I intend to limit myself to the use of any precise number of clusters of volute springs in the construction of my said improved car-spring. My object is to form a car-spring of great power by the use of large numbers of light volute springs of small cost, and to prevent the said volute springs from being injured by percussive blows I arrange in the same casing therewith a series of elastically-yielding layers, H H, of some suitable material, and I combine the said springs and layers with each other, and cause them to act harmoniously within their casing by means of the metallic plates D D' and E E' and the pins $j\ j$, in the manner represented in the accompanying drawings.

Having thus fully described my improved car-spring, what I claim therein as new, and desire to secure by Letters Patent, is—

The arrangement, within a suitable casing, of one or more series of volute springs, I I, and a number of layers, H H, of some elastically-yielding substance, when the requisite number of metallic combining and steadying plates D E are arranged with the said volute springs and elastically-yielding layers in the manner represented by the accompanying drawings and herein particularly set forth.

The above specification of my new and improved car-spring signed and witnessed this 22d day of December, 1860.

RICHD. VOSE.

Witnesses:
 A. L. BUTLER,
 CHARLES D. GIBSON.